(12) United States Patent
Liu et al.

(10) Patent No.: US 8,588,065 B2
(45) Date of Patent: Nov. 19, 2013

(54) METHOD, SYSTEM, AND NETWORK APPARATUS FOR EVALUATING QUALITY OF EXPERIENCE

(75) Inventors: Ying Liu, Shenzhen (CN); Qi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 719 days.

(21) Appl. No.: 12/860,285

(22) Filed: Aug. 20, 2010

(65) Prior Publication Data

US 2011/0007648 A1   Jan. 13, 2011

Related U.S. Application Data

(63) Continuation of application No. PCT/CN2009/071536, filed on Apr. 28, 2009.

(30) Foreign Application Priority Data

May 7, 2008 (CN) .......................... 2008 1 0092893

(51) Int. Cl.
*H04L 12/26* (2006.01)
*H04L 12/28* (2006.01)
*G06F 15/173* (2006.01)

(52) U.S. Cl.
USPC ...... 370/230; 370/235; 370/252; 370/395.21; 709/223

(58) Field of Classification Search
USPC ......... 370/229–240, 252, 328–333, 400–402; 709/217–229, 230–244
See application file for complete search history.

(56) References Cited

U.S. PATENT DOCUMENTS

| | | | |
|---|---|---|---|
| 7,161,915 B2 | 1/2007 | Womack et al. | |
| 7,599,307 B2 * | 10/2009 | Seckin et al. | 370/252 |
| 7,716,321 B2 * | 5/2010 | Dacosta | 709/223 |
| 8,280,994 B2 * | 10/2012 | Blouin et al. | 709/223 |
| 2005/0089043 A1 | 4/2005 | Seckin et al. | |
| 2005/0237968 A1 | 10/2005 | Womack et al. | |
| 2007/0239820 A1 | 10/2007 | Zhong et al. | |
| 2008/0098446 A1 * | 4/2008 | Seckin et al. | 725/114 |
| 2008/0155087 A1 * | 6/2008 | Blouin et al. | 709/223 |
| 2011/0090922 A1 * | 4/2011 | Wang et al. | 370/465 |

FOREIGN PATENT DOCUMENTS

| | | | |
|---|---|---|---|
| CN | 1839597 A | 9/2006 | |
| CN | 1965239 A | 5/2007 | |
| CN | 101188847 A | 5/2008 | |
| CN | 101364936 A | 2/2009 | |
| WO | WO 2005/022852 A1 | 3/2005 | |
| WO | WO 2005022852 A1 * | 3/2005 | H04L 12/56 |

OTHER PUBLICATIONS

European Office Action, European Application No. 09 741 694.5-2416, Applicant: Huawei Technologies Co., Ltd., Dated: Jun. 10, 2011, 7 pages.

(Continued)

*Primary Examiner* — Tri H Phan
(74) *Attorney, Agent, or Firm* — Slater & Matsil, L.L.P.

(57) ABSTRACT

A method for evaluating quality of experience (QoE) includes obtaining service parameter information sent from a media server. Quality of service (QoS) metrics is obtained. QoE is obtained according to the service parameter information and the QoS metrics.

12 Claims, 6 Drawing Sheets

(56) References Cited

OTHER PUBLICATIONS

International Search Report, International application No. PCT/CN2009/071536, Date of mailing of the international search report, Aug. 6, 2009, 4 pages.

ITU-T, "Series Y: Global Information Infrastructure and Internet Protocol Aspects, Internet protocol aspects—Quality of service and network performance, Internet protocol data communication service—IP packet transfer and availability performance parameters," ITU-T Recommendation Y.1540, Dec. 2002, 36 pages.

ITU-T SG12, "Proposal of video quality estimation model for G.OMVS and P.NAMS," Source: Nippon Telegraph and Telephone Corporation (NTT), Japan, Question: Q13/12 and Q14/12, Mar. 10-13, 2008, Shenzhen, China, 4 pages.

ITU-T SG12, "Proposal of audio quality estimation model for P.NAMS and G.OMVS," Source: Nippon Telegraph and Telephone Corporation (NTT), Japan, Question: Q13 and 14/12, Mar. 10-13, 2008, Shenzhen, China, 4 pages.

ITU-T SG12, "Proposal of multimedia quality-estimation model for G.OMVS and P.NAMS," Source: Nippon Telegraph and Telephone Corporation (NTT), Japan, Question: Q13 and Q14/12, Mar. 10-13, 2008, Shenzhen, China, 3 pages.

ITU-T SG12, "Proposed properties of P.NAMS," Source: Ericsson AB, Question: Q14/12, Mar. 10-13, 2008, Shenzhen, China, 4 pages.

International Telecommunication Union—Telecommunication Standardization Sector, "Draft Recommendation G.IPTV-PMP: Performance monitoring for IPTV," Study Group 12, TD 166 (WP 3/12), May 22-30, 2008, Geneva, Switzerland, 36 pages.

Zapater, M., et al., "A Proposed Approach for Quality of Experience Assurance for IPTV," Proceedings of the First International Conference on the Digital Society (ICDS '07), Jan. 2-6, 2007, 6 pages, Guadeloupe, French Caribbean, IEEE.

Written Opinion of the International Searching Authority, International Application No. PCT/CN2009/071536, Applicant: Huawei Technologies Co., Ltd., et al., Date of mailing: Aug. 6, 2009, 12 pages.

Supplementary European Search Report, European Application No. 09741694.5-2416, International Application No. PCT/CN2009/071536, Applicant: Huawei Technologies Co., Ltd., Dated: Jan. 21, 2011, 9 pages.

\* cited by examiner

| Luminance and chromaticity parameters / Motion vector | Luminance 10 Chromaticity 10 | Luminance 20 Chromaticity 30 | |
|---|---|---|---|
| Low | 0.1,0.2,0.5,2 | 0.2,0.2,0.5,1.5 | |
| Middle | 0.5,0.2,0.3,2 | | |
| High | | | |

FIG. 3 under brain# METHOD, SYSTEM, AND NETWORK APPARATUS FOR EVALUATING QUALITY OF EXPERIENCE This application is a continuation of co-pending International Application No. PCT/CN2009/071536, filed Apr. 28, 2009, which designated the United States and was not published in English, and which claims priority to Chinese Application No. 200810092893.1, filed May 7, 2008, both of which applications are incorporated herein by reference.

TECHNICAL FIELD

The present invention relates to the network management field, and in particular, to a method, system, and network apparatus for evaluating quality of experience (QoE).

BACKGROUND

In network applications, network providers and service providers usually care about the quality of Internet Protocol television (IPTV) services provided to users. The traditional quality of service (QoS) parameter cannot visually reflect user experience. To represent the user experience of IPTV services more obviously, the quality of experience (QoE) parameter is used. The network providers and service providers deploy a measuring point at a critical location on an IPTV service transmission network, and integrate algorithms for calculating a QoE value at the measuring point. The measuring point detects required data, and obtains the QoE value of the measuring point by using those algorithms.

The most common method for obtaining the QoE value is using the QoS metrics and, the codec parameters and/or service content information, as the input parameters to calculate the QoE value. This method is called a quality estimation model. FIG. 1 is a schematic diagram illustrating a method for monitoring the QoE. The measuring point in FIG. 1 obtains the parameter information required for calculating the QoE value by detecting packets that pass through the measuring point, that is, the measuring point obtains the QoS metrics and the codec parameters, or the QoS metrics and the service content information, or the QoS metrics and the codec parameters and the service content information. Then, the measuring point obtains the QoE value by using a predefined algorithms for calculating the QoE.

During the implementation of the present invention, the inventor discovered the following problems in the prior art. First, the measuring point deployed on the network may not have the ability to obtain all the parameter information. The method in the prior art imposes high requirements on the measuring point. Second, when the measuring point has the ability to obtain the codec parameters or the service content information, the measuring point bears a heavy burden.

SUMMARY OF THE INVENTION

To evaluate QoE when the measuring point does not have the ability to calculate the QoE and ease the burden on the measuring point when the measuring point has the ability to calculate the QoE, embodiments of the present invention provide a method, system, and network apparatus for evaluating QoE. The technical solution provided in embodiments of the present invention is as follows:

A method for evaluating QoE includes obtaining service parameter information sent from a media server. QoS metrics are also obtained. QoE can be obtained according to the service parameter information and the QoS metrics.

A network apparatus includes an obtaining module that is configured to obtain match information and service parameter information, where the service parameter information is sent from a media server. A matching module is configured to obtain QoS metrics corresponding to the service parameter information according to the match information A processing module is configured to obtain QoE according to the service parameter information and the QoS metrics.

A system for evaluating QoE includes a media server, a service monitoring server, a measuring apparatus, and a network monitoring server.

The measuring apparatus is configured to obtain match information and service parameter information through the service monitoring server and the network monitoring server, where the service parameter information is sent from the media server.

The measuring apparatus is configured to obtain QoS metrics corresponding to the service parameter information according to the match information, and obtain QoE according to the service parameter information and the QoS metrics.

In embodiments of the present invention, the service parameter information required for calculating the QoE value is obtained from the media server, and a QoE value is calculated according to the service parameter information and the QoS metrics corresponding to the service parameter information. In this way, the QoE may be evaluated when the measuring point does not have the ability to calculate the QoE, or the burden of the measuring point is eased when the measuring point has the ability to calculate the QoE.

BRIEF DESCRIPTION OF THE DRAWINGS

FIG. 3 is a schematic diagram illustrating a model coefficient table in Embodiment 1 and Embodiment 3 of the present invention;

DETAILED DESCRIPTION OF ILLUSTRATIVE EMBODIMENTS

To make the technical solution, objectives and merits of the present invention clearer, the embodiments of the present invention are hereinafter described in detail with reference to the accompanying drawings.

Embodiment 1

Figure 1:
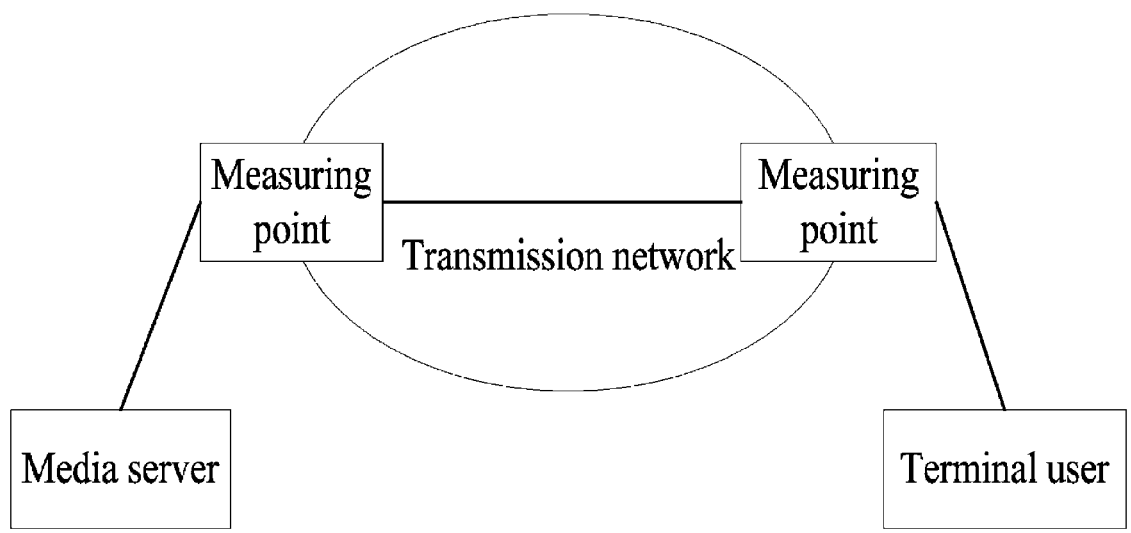
FIG. 1 is a schematic diagram illustrating a method for evaluating QoE in the prior art.
Figure 2:
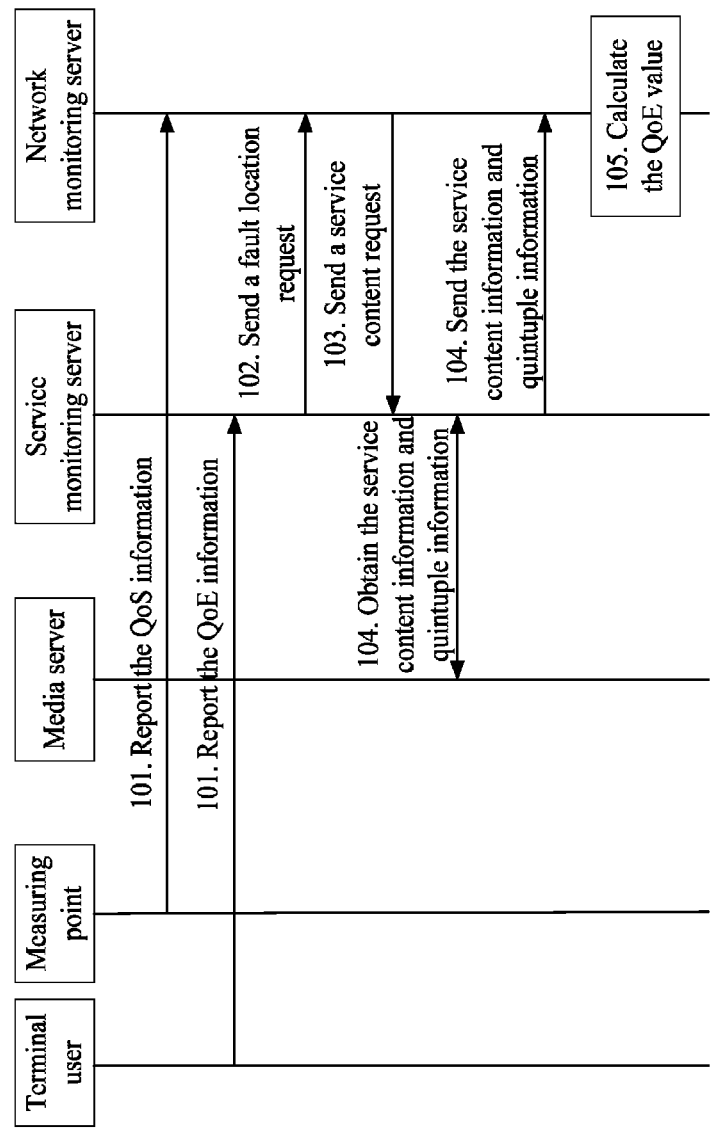
FIG. 2 is a schematic diagram illustrating a method for evaluating QoE in Embodiment 1 of the present invention.

Embodiment 1 of the present invention provides a method for evaluating QoE. This method is used in a scenario in which the measuring point deployed on the network does not have the ability to calculate the QoE value by using a hybrid model but the network monitoring server has such ability. In this scenario, the service monitoring server obtains service content information from the media server, and sends the service content information to the network monitoring server; the network monitoring server calculates a QoE value according to the received service content information and the QoS metrics corresponding to the service content information obtained from the measuring point. Thus, the QoE value may be used to evaluate the user's experience. As shown in FIG. 2, the method provided in Embodiment 1 of the present invention includes the following steps.

Step 101: An end user performs real-time monitoring on the QoE value of the IPTV service, reports the QoE value and obtained quintuple information of the IPTV service to the service monitoring server in real time. The measuring point deployed on the transmission network monitors the QoS information about the IPTV service when the IPTV service is transmitted on the transmission network, and reports the QoS information to the network monitoring server in real time. The network monitoring server stores the received QoS information.

The QoS information includes the quintuple information of the IPTV service and QoS metrics. The quintuple information of the IPTV service includes IP address of the media server and the end user, source port number of the media server providing the IPTV service, and port number and protocol type of the end user receiving the IPTV service. The QoS metrics includes packet loss ratio, jitter parameter, and delay parameter.

Step 102: The service monitoring server receives the QoE value and the quintuple information of the IPTV service sent by the end user, stores the quintuple information of the IPTV service, and analyzes the QoE value in real time. When finding that the QoE value of the end user fails to meet the requirement of the end user or that the QoE value is exceptional continuously, the service monitoring server judges whether the media server or the network is faulty; if determining that the network is faulty, the service monitoring server sends a fault location request to the network monitoring server, requesting the network monitoring server to locate causes for the reducing of the QoE value of the IPTV service of the current end user, where the fault location request includes the quintuple information corresponding to the IPTV service whose QoE value fails to meet the requirement of the end user or is exceptional.

Step 103: The network monitoring server receives the fault location request, and sends a service content request to the service monitoring server, requesting the service monitoring server to provide the service content information of the IPTV service of the current end user, where the service content request includes the quintuple information of the IPTV service.

Step 104: The service monitoring server receives the service content request, extracts the service content information from the media server according to the quintuple information of the IPTV service, and sends the quintuple information of the IPTV service and the extracted service content information to the network monitoring server.

The media server obtains the codec parameters and service content information during the process of encoding the IPTV service information, and stores the codec parameters and service content information on the media server. When the service monitoring server requires such information, the service monitoring server can extract such information from the media server. The codec parameters includes video codec type, video size, audio codec type, coded total bitrate, codec compression parameter, and group of picture (GOP) used in the video codec. The service content information includes motion vector, and luminance and chromaticity of a program.

Step 105: The network monitoring server receives the service content information, matches the QoS metrics of the IPTV service of the current end user according to the quintuple information of the IPTV service, and uses the QoS metrics and service content information as the input parameters to calculate the QoE value, where the QoS metrics of the IPTV service is sent from one or multiple measuring points on the network.

The measuring point may report the QoS information about many services. Thus, the network monitoring server may match the quintuple information of the IPTV service in the QoS information stored on the network monitoring server according to the quintuple information of the IPTV service sent from the service monitoring server, and determine the QoS metrics of the IPTV service of the current end user, where the matched QoS metrics of the IPTV service of the current end user is sent from one or multiple measuring points. In actual applications, the QoS metrics of the IPTV service of the current end user may be obtained by using the program ID of the application layer or other methods. Details are not further given.

After obtaining the QoS metrics of the measuring point, the network monitoring server searches the model coefficient table stored on the network monitoring server for corresponding model coefficients (a0, a1, a2, and a3) according to the motion vector, luminance and chromaticity of the program in the service content information, and uses the obtained model coefficients and the QoS metrics as the input parameters of the hybrid model to calculate the QoE value. A schematic model coefficient table is shown in FIG. 3. When the motion vector, luminance, and chromaticity of the program in the service content information are set to low, 10, and 10 respectively, the model coefficients found in the model coefficient table are as follows: a0=0.1, a1=0.2, a2=0.5, and a3=2. The obtained model coefficients and service content information are input to the following hybrid model: QoE=a0+a1×packet loss ratio+a2×jitter parameter+a3×delay parameter, and then the QoE value is obtained.

In addition, in Embodiment 1, the network monitoring server may not request the service monitoring server to provide the service content information required for calculating the QoE value after receiving the fault location request from the service monitoring server. Instead, after receiving the QoS information reported by the measuring point, the network monitoring server stores the QoS information and match information (for example, quintuple information of the IPTV service) corresponding to the QoS information. In addition, the network monitoring server sends a service content request that carries the quintuple information of the IPTV service to the service monitoring server directly, requesting the service monitoring server to provide the service content information of the IPTV service of the current end user; the service monitoring server extracts corresponding service content information from the media server according to the quintuple information of the IPTV service in the received service content request, and sends the extracted service content information and the quintuple information of the IPTV service to the network monitoring server; the network monitoring server receives the service content information, matches the QoS metrics of the IPTV service of the current end user stored on the network monitoring server according to the received quintuple information of the IPTV service, and calculates the QoE value according to the matched QoS metrics and obtained service content information, where the QoS metrics of the IPTV service of the current end user is sent from one or multiple measuring points on the network.

After receiving the service content information sent from the service monitoring server, the network monitoring server may also send the service content information to other network monitoring servers on the same network. That is, the network monitoring server sends the service content information to other network monitoring servers according to requests from other network monitoring servers.

The technical solution in Embodiment 1 is also applicable to scenarios in which the QoE value is calculated according to the QoS metrics and the codec parameters and according to the QoS metrics and codec parameters, and the service content information. The principles are similar to the principles for calculating the QoE value according to the QoS metrics and service content information, and thus are not further described.

The technical solution in Embodiment 1 is based on the IPTV service. In actual applications, the technical solution may also be applied to the fixed network field or the mobile network field.

In this embodiment, the service monitoring server obtains the service content information and/or the codec parameters from the media server, and sends the service content information and/or the codec parameters to the network monitoring server; the network monitoring server calculates the QoE value according to the received service content information and/or the codec parameters and the QoS metrics corresponding to the service content information obtained from the measuring point. In this way, the QoE value may also be evaluated when the measuring point does not have the ability to calculate the QoE by using the hybrid model. Therefore, the requirement for the measuring point is lowered.

Embodiment 2

Figure 4:
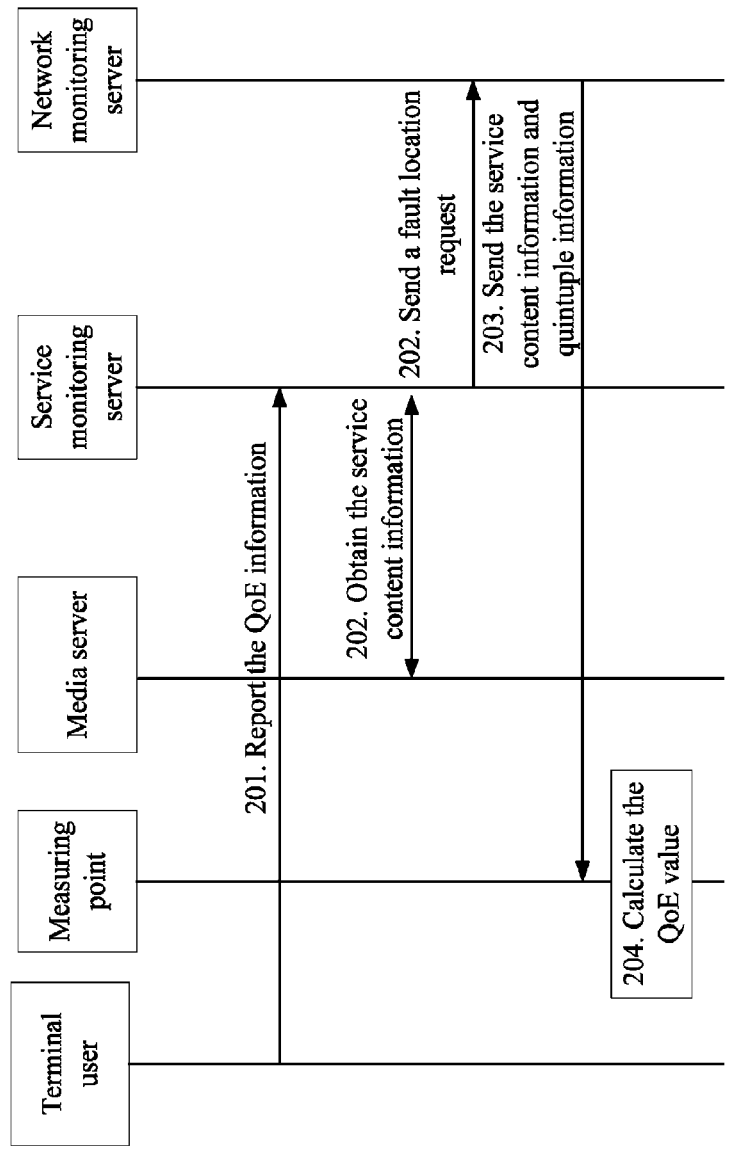
FIG. 4 is a schematic diagram illustrating a method for evaluating QoE in Embodiment 2 of the present invention.

Embodiment 2 of the present invention provides a method for evaluating QoE. This method is used in a scenario in which the measuring point deployed on the network has the ability to calculate the QoE value by using the hybrid model. In this scenario, the measuring point obtains service content information from the media server through the service monitoring server and the network monitoring server, and calculates the QoE value according to the obtained service content information and the QoS metrics. As shown in FIG. 4, the method provided in Embodiment 2 of the present invention includes the following steps.

Step 201: The end user performs real-time monitoring on the QoE value of a multimedia service, and reports the QoE value and the quintuple information of the IPTV service to the service monitoring server in real time.

Step 202: The service monitoring server receives the QoE value and the quintuple information of the IPTV service fed back by the end user, stores the quintuple information of the IPTV service, and analyzes the QoE value in real time. When finding that the QoE value of the end user fails to meet the requirement of the end user or that the QoE value is exceptional continuously, the service monitoring server judges whether the media server or the network is faulty; if determining that the network is faulty, the service monitoring server extracts the service content information from the media server, and sends a fault location request to the network monitoring server, requesting the network monitoring server to locate causes for the reducing of the QoE value of the IPTV service of the end user, where the fault location request carries the service content information and the quintuple information corresponding to the IPTV service whose QoE value fails to meet the requirement of the end user or is exceptional.

Step 203: After receiving the fault location request, the network monitoring server finds a measuring point that integrates the hybrid model and requires the service content information in the local path according to the service transmission path and registration information of the measuring point, and sends the service content information and the quintuple information of the IPTV service to the measuring point. In this step, one or multiple measuring points are available.

Step 204: The measuring point receives the service content information and the quintuple information of the IPTV service, matches the QoS metrics of the IPTV service of the current end user according to the received quintuple information of the IPTV service, and uses the service content information and the QoS metrics as the input parameters of the hybrid model to calculate the QoE value of the IPTV service received locally. In addition, the measuring point may send the calculated QoE value to the network monitoring server.

The principles for determining the QoS metrics of the IPTV service of the current end user according to the quintuple information of the IPTV service and calculating the QoE value of the IPTV service received locally according to the service content information and the QoS metrics by the measuring point are similar to the principles for calculating the QoE value by the network monitoring server according to the QoS metrics and the service content information in step 105, and thus are not further described.

In addition, in Embodiment 2, the measuring point may not receive the service content information from the network monitoring server passively, but send a service content information request directly to the network monitoring server, where the request includes match information (for example, quintuple information of the IPTV service); the network monitoring server sends a service content information request that includes the quintuple information of the IPTV service to the service monitoring server; the service monitoring server extracts the service content information from the media server according to the quintuple information of the IPTV service in the request, and forwards the service content information and the quintuple information of the IPTV service to the measuring point through the network monitoring server; the measuring point matches the QoS metrics of the IPTV service of the current end user according to the quintuple information of the IPTV service, and uses the service content information and the QoS metrics as the input parameters of the hybrid model to calculate the QoE value of the IPTV service received locally.

The technical solution in Embodiment 2 is also applicable to scenarios in which the QoE value is calculated according to the QoS metrics and the codec parameters or according to the QoS metrics and codec parameters, and the service content information. The principles are similar to the principles for calculating the QoE value according to the QoS metrics and service content information, and thus are not further described.

The technical solution in Embodiment 2 is based on the IPTV service. In actual applications, the technical solution may also be applied to the fixed network field or the mobile network field.

In this embodiment, the measuring point obtains the service content information and/or the codec parameters from the media server through the service monitoring server and the network monitoring server, and calculates the QoE value according to the obtained service content information and/or the codec parameters and the QoS metrics. In this way, the measuring point does not need to occupy additional resources. Therefore, the burden on the measuring point is eased.

Embodiment 3

Embodiment 3 of the present invention provides a measuring apparatus. The measuring apparatus may be a measuring point deployed on the network and is configured to evaluate the QoE of the IPTV service. Specifically, the measuring apparatus obtains and stores the QoS information in real time, where the QoS information includes quintuple information of the IPTV service and QoS metrics.

The service monitoring server receives the quintuple information of the IPTV service and the QoE value fed back by the end user, and analyzes the QoE value in real time. When finding that the QoE value of the current end user fails to meet the requirement of the end user or that the QoE value is exceptional continuously, the service monitoring server judges whether the media server or the network is faulty; if determining that the network is faulty, the service monitoring server extracts service content information from the media server according to the quintuple information corresponding to the IPTV service whose QoE value fails to meet the requirement of the end user or is exceptional, sends the quintuple information corresponding to the IPTV service whose QoE value fails to meet the requirement of the end user or is exceptional and the extracted parameter information to the network monitoring server through a fault location request; the network monitoring server forwards the quintuple information corresponding to the IPTV service whose QoE value fails to meet the requirement of the end user or is exceptional and the extracted parameter information to the measuring apparatus that requires the service content information.

The measuring apparatus receives the parameter information and the quintuple information corresponding to the IPTV service whose QoE value fails to meet the requirement of the end user or is exceptional, determines the QoS metrics of the IPTV service of the current end user according to the quintuple information of the IPTV service, and uses the parameter information and the QoS metrics as the input parameters of the hybrid model to calculate the QoE value of the IPTV service received locally. In addition, the measuring apparatus may send the calculated QoE value to the network monitoring server.

The principles for determining the QoS metrics of the IPTV service of the current end user according to the quintuple information corresponding to the IPTV service whose QoE value fails to meet the requirement of the end user or is exceptional and calculating the QoE value of the IPTV service received locally according to the parameter information and the QoS metrics by the measuring apparatus are similar to the principles for calculating the QoE value by the network monitoring server according to the QoS metrics and other parameter information, and thus are not further described.

The parameter information may be the service content information and/or the codec parameters.

Figure 5:
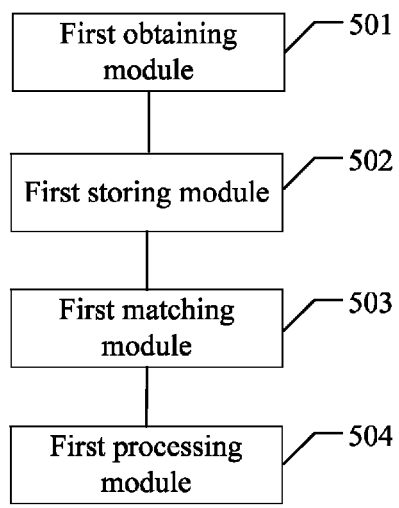
FIG. 5 shows a structure of a measuring apparatus in Embodiment 3 of the present invention.

As shown in FIG. 5, a typical measuring apparatus includes a first obtaining module 501, a first storing module 502, a first matching module 503, and a first processing module 504.

The first obtaining module 501 is configured to: obtain match information and QoS metrics of the IPTV service of the current end user, and obtain the service parameter information required for calculating the QoE from the media server.

The match information is quintuple information, program ID or other information. Specifically, the quintuple information includes: IP address of the media server and the end user, source port number of the media server providing the IPTV service, and port number and protocol type of the end user receiving the IPTV service. The service parameter information is the IPTV service content information or the codec parameters. The QoS metrics may be measured by the monitoring apparatus.

The first storing module 502 is configured to store QoS information and the QoE value calculated by the first processing module 504.

The QoS information includes quintuple information and QoS metrics.

The first matching module 503 is configured to obtain the QoS metrics corresponding to the service parameter information according to the match information.

For example, when the match information is quintuple information, the first matching module 503 determines the QoS metrics of the IPTV service of the current end user in the QoS information stored by the first storing module 502 according to the quintuple information obtained from the service monitoring server.

The first processing module 504 is configured to calculate QoE according to the service parameter information obtained from the media server and the QoS metrics that is output by the first matching module 503 and corresponds to the service parameter information.

Embodiment 3 of the present invention also provides a network monitoring server configured to evaluate the QoE of the IPTV service. Specifically, the network monitoring server may receive and store the QoS information that is obtained when the IPTV service monitored in real time is transmitted on the transmission network and reported by the measuring point on the transmission network on a real-time basis. The QoS information includes the quintuple information of the IPTV service and the QoS metrics. The quintuple information of the IPTV service includes IP address of the media server and the end user, source port number of the media server providing the IPTV service, and port number and protocol type of the end user receiving the IPTV service. The QoS metrics includes packet loss ratio, jitter parameter, and delay parameter information.

The network monitoring server receives a fault location request sent from the service monitoring server, where the fault location request includes quintuple information corresponding to the IPTV service whose QoE value fails to meet the requirement of the end user or is exceptional.

The network monitoring server obtains service content information from the service monitoring server according to the quintuple information corresponding to the IPTV service whose QoE value fails to meet the requirement of the end user or is exceptional in the fault location request, where the service content information is obtained by the network monitoring server from the media server according to the quintuple information of the IPTV service.

The network monitoring server determines QoS metrics of the IPTV service of the current end user according to the quintuple information corresponding to the IPTV service whose QoE value fails to meet the requirement of the end user or is exceptional, and uses the QoS metrics and the service content information as the input parameters to calculate the QoE value, where the QoS metrics of the IPTV service is sent from one or multiple measuring points on the network.

The measuring point may report the QoS information about many services. Thus, the network monitoring server may match the quintuple information of the IPTV service in the QoS information stored on the network monitoring server according to the quintuple information of the IPTV service sent from the service monitoring server, and determine the QoS metrics of the IPTV service of the current end user, where the matched QoS metrics of the IPTV service of the current end user is sent from one or multiple measuring points. In actual applications, the QoS metrics of the IPTV service of the current end user may be obtained according to the program ID of the application layer or other methods. Details are not further given.

After obtaining the QoS metrics of the measuring point, the network monitoring server searches the model coefficient table stored on the network monitoring server for corresponding model coefficients (a0, a1, a2, and a3) according to the motion vector, and luminance and chromaticity of the program in the service content information, and uses the obtained model coefficients and the QoS metrics as the input parameters of the hybrid model to calculate the QoE value. Specifically, the model coefficient table is shown in FIG. 3. When the motion vector, luminance, and chromaticity of the program in the service content information are set to low, 10, and 10 respectively, the model coefficients found in the model coefficient table are as follows: a0=0.1, a1=0.2, a2=0.5, and a3=2. The obtained model coefficients and service content information are input to the following hybrid model: QoE=a0+a1×packet loss ratio+a2×jitter parameter+a3×delay parameter, and then the QoE value is obtained.

In addition, in Embodiment 3, the network monitoring server may not request the service monitoring server to provide the service content information required for calculating the QoE value after receiving the fault location request from the service monitoring server. Instead, after receiving the QoS information reported by the measuring point in real time, the network monitoring server stores the QoS information and sends a service content request that carries the quintuple information of the IPTV service to the service monitoring server directly, requesting the service monitoring server to provide the service content information of the IPTV service of the current end user, and receives the service content information and quintuple information of the IPTV service provided by the service monitoring server, where the service content information is extracted by the service monitoring server from the media server according to the quintuple information of the IPTV service sent from the network monitoring server; the network monitoring server matches the received quintuple information of the IPTV service with the QoS metrics of the IPTV service of the current end user stored on the network monitoring server, and calculates the QoE value according to the matched QoS metrics and obtained service content information, where the QoS metrics of the IPTV service of the current end user is sent from one or multiple measuring points on the network.

Similarly, the technical solution for obtaining the QoE value by the network monitoring server may be applicable in a scenario in which the QoE value is obtained according to the codec parameters and QoS metrics and according to the codec parameters, the service content information, and the QoS metrics.

Figure 6:
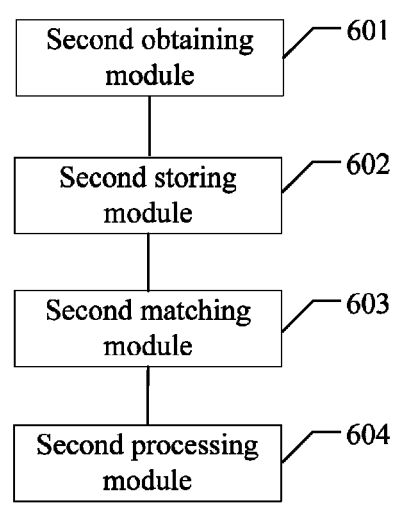
FIG. 6 shows a structure of a network monitoring server in Embodiment 3 of the present invention.

As shown in FIG. 6, a typical network monitoring server includes a second obtaining module 601, a second storing module 602, a second matching module 603, and a second processing module 604.

The second obtaining module 601 is configured to obtain match information, service parameter information required for calculating the QoE from the media server, and QoS metrics from the measuring point.

The match information is quintuple information, program ID or other information.

The service parameter information is the service content information and/or the codec parameters. The QoS metrics is measured by the measuring point on the network.

The second storing module 602 is configured to store the QoS information obtained from the measuring apparatus and the QoE value calculated by the second processing module 604.

The second matching module 603 is configured to obtain the QoS information corresponding to the service parameter information according to the match information obtained by the second obtaining module 601.

The second processing module 604 is configured to calculate the QoE according to the service parameter information obtained from the media server and the QoS information that is output by the second matching module 603 and corresponds to the service parameter information.

Figure 7:
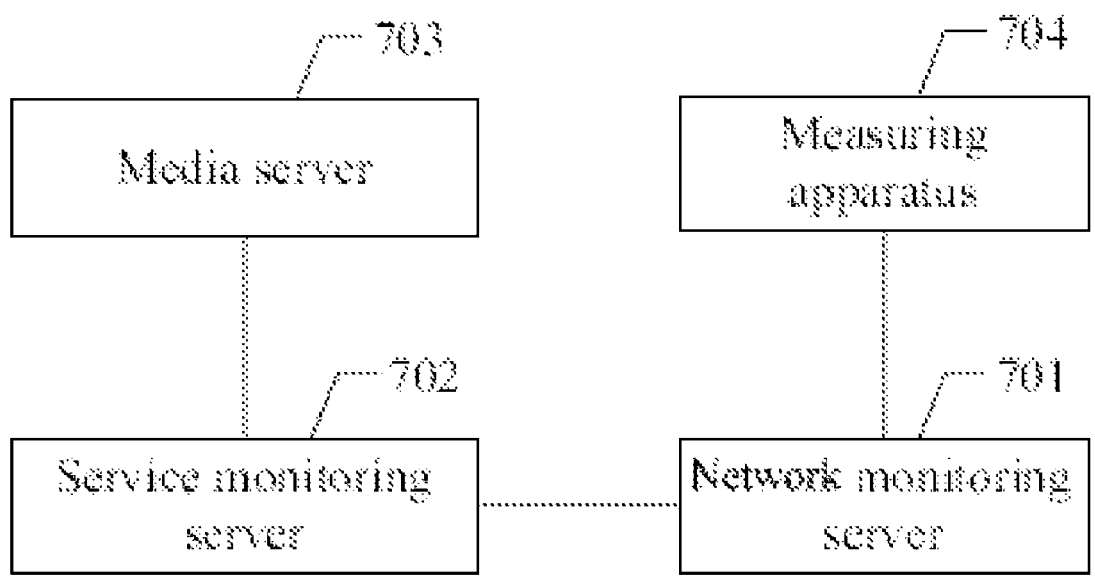
FIG. 7 shows a structure of a system for evaluating QoE in Embodiment 3 of the present invention.

Embodiment 3 of the present invention also provides a system for evaluating QoE. As shown in FIG. 7, the system includes: a network monitoring server 701, a service monitoring server 702, a media server 703, and a measuring apparatus 704.

The network monitoring server 701 is configured to: obtain match information and the service parameter information required for calculating the QoE through the service monitoring server 702, and obtain the QoS metrics from the measuring apparatus 704, where the match information is quintuple information, program ID or other information, the service parameter information is sent from the media server and is the service content information and/or the codec parameters, and the QoS metrics is sent from the measuring apparatus 704 on the network.

The network monitoring server 701 is configured to: obtain the QoS metrics corresponding to the service parameter information according to the match information, and calculate the QoE value according to the service parameter information and the QoS metrics corresponding to the service parameter information.

The measuring apparatus 704 is configured to obtain the match information through the service monitoring server 702 and the network monitoring server 701, and calculate the service parameter information required for calculating the QoE value, where the match information is quintuple information, program ID (identity) or other information, the service parameter information is sent from the media server 703 and is the service content information or the codec parameters, and the QoS metrics is measured by the measuring apparatus 704.

The measuring apparatus 704 is further configured to obtain the QoS metrics corresponding to the service parameter information according to the match information, and calculate the QoE value according to the service parameter information and the QoS metrics corresponding to the service parameter information.

The technical solution provided in Embodiment 3 is based on the IPTV service. In actual applications, the technical solution may also be applied to the fixed network field or the mobile network field.

According to the technical solution provided in embodiments of the present invention, the service parameter information required for calculating the QoE value is obtained from the media server, and a QoE value is calculated according to the service parameter information and the QoS metrics corresponding to the service parameter information. In this way, the QoE may be evaluated when the measuring apparatus does not have the ability to calculate the QoE, and the burden of the measuring apparatus is eased when the measuring apparatus has the ability to calculate the QoE.

Detailed above are the embodiments of the present invention. In addition, the principle and implementation of the present invention are described herein through specific examples. The above descriptions of the embodiments are merely provided for ease of understanding of the method and core ideas of the present invention. Persons having ordinary skill in the art can make variations and modifications to the present invention in terms of specific implementations and application scopes according to the ideas of the present invention. Therefore, the specification shall not be construed as limitations to the present invention.

What is claimed is:

1. A method for evaluating quality of experience (QoE), the method comprising:
   obtaining service parameter information sent from a media server;
   obtaining match information, wherein the match information is quintuple information of IPTV service or a program ID;
   obtaining quality of service (QoS) metrics corresponding to the service parameter information according to the match information; and
   calculating QoE according to the service parameter information and the QoS metrics, wherein the service parameter information comprises service content information or a codec parameter, the service content information comprises motion vector, and luminance and chromaticity of a program.

2. The method of claim 1, wherein:
   obtaining the match information and the service parameter information comprises obtaining, by a measuring point, the match information and the service parameter information through a service monitoring server and a network monitoring server, wherein the service parameter information is sent from the media server;
   obtaining the QoS metrics comprises obtaining, by a measuring point, the QoS metrics corresponding to the service parameter information according to the match information; and
   calculating the QoE comprises calculating, by a measuring point, the QoE according to the service parameter information and the QoS metrics.

3. The method of claim 2, wherein obtaining, by the measuring point, the match information and the service parameter information through the service monitoring server and the network monitoring server comprises:
   sending, by the service monitoring server, a fault location request to the network monitoring server when it is determined that a fault occurs on a network, wherein the fault location request comprises the match information and the service parameter information that is obtained from the media server; and
   receiving, by the network monitoring server, the fault location request, and sending the match information and the service parameter information to the measuring point that requires the service parameter information.

4. The method of claim 2, wherein obtaining, by the measuring point, the match information and the service parameter information through the service monitoring server and the network monitoring server comprises:
   sending, by the measuring point, a service parameter information request that comprises the match information to the service monitoring server through the network monitoring server; and
   obtaining, by the service monitoring server, the service parameter information from the media server according to the match information in the service parameter information request, and sending the match information and the service parameter information to the measuring point through the network monitoring server.

5. The method of claim 1, wherein:
   obtaining the match information and the service parameter information comprises obtaining, by a network monitoring server, the match information and the service parameter information through a service monitoring server, where the service parameter information is sent from the media server;
   obtaining the QoS metrics comprises obtaining, by the network monitoring server, the QoS metrics corresponding to the service parameter information according to the match information, where the QoS metrics is sent from a measuring point; and
   calculating the QoE comprises calculating, by the network monitoring server, the QoE according to the service parameter information and the QoS metrics.

6. The method of claim 5, wherein obtaining, by the network monitoring server, the match information and the service parameter information through the service monitoring server comprises:
   receiving, by the network monitoring server, a fault location request that comprises the match information, from the service monitoring server;
   sending, by the network monitoring server, a service parameter information request that comprises the match information to the service monitoring server; and
   receiving, by the network monitoring server, the service parameter information from the service monitoring server, wherein the service parameter information is obtained by the service monitoring server from the media server according to the match information in the service parameter information request.

7. The method of claim 5, wherein obtaining, by the network monitoring server, the match information and the service parameter information through the service monitoring server comprises:
   sending, by the network monitoring server, a service parameter information request that comprises the match information to the service monitoring server; and
   receiving, by the network monitoring server, the service parameter information from the service monitoring server, wherein the service parameter information is obtained by the service monitoring server from the media server according to the match information in the service parameter information request.

8. The method of claim 1, wherein obtaining calculating the QoE comprises:
   searching a model coefficient table for corresponding model coefficients according to the motion vector, and luminance and chromaticity of the program in the service content information; and
   using the corresponding model coefficients and the QoS metrics as input parameters of a hybrid model to calculate the QoE value.

9. A network apparatus, comprising:
   an obtaining module, configured to obtain match information and service parameter information, wherein the service parameter information is sent from a media server;
   a matching module, configured to obtain quality of service (QoS) metrics corresponding to the service parameter information according to the match information; and
   a processing module, configured to calculate quality of experience (QoE) according to the service parameter information and the QoS metrics,
   wherein the service parameter information comprises service content information or a codec parameter, the service content information comprises motion vector, and luminance and chromaticity of a program.

10. The network apparatus of claim 9, wherein the network apparatus comprises a network measuring point.

11. The network apparatus of claim 9, further comprising a storing module, configured to store the service parameter information and the QoE.

12. A system for evaluating quality of experience (QoE), comprising:
- a network monitoring server;
- a service monitoring server;
- a media server; and
- a measuring apparatus;
- wherein the measuring apparatus is configured to obtain match information and service parameter information through the service monitoring server and the network monitoring server,
- wherein the service parameter information is sent from the media server, and the match information is quintuple information of IPTV service or a program ID,
- wherein the measuring apparatus is configured to obtain quality of service (QoS) metrics corresponding to the service parameter information according to the match information, and
- calculate QoE according to the service parameter information and the QoS metrics, and
- wherein the service parameter information comprises service content information or codec parameter, the service content information comprises motion vector, and luminance and chromaticity of a program.

* * * * *